Figure 4:
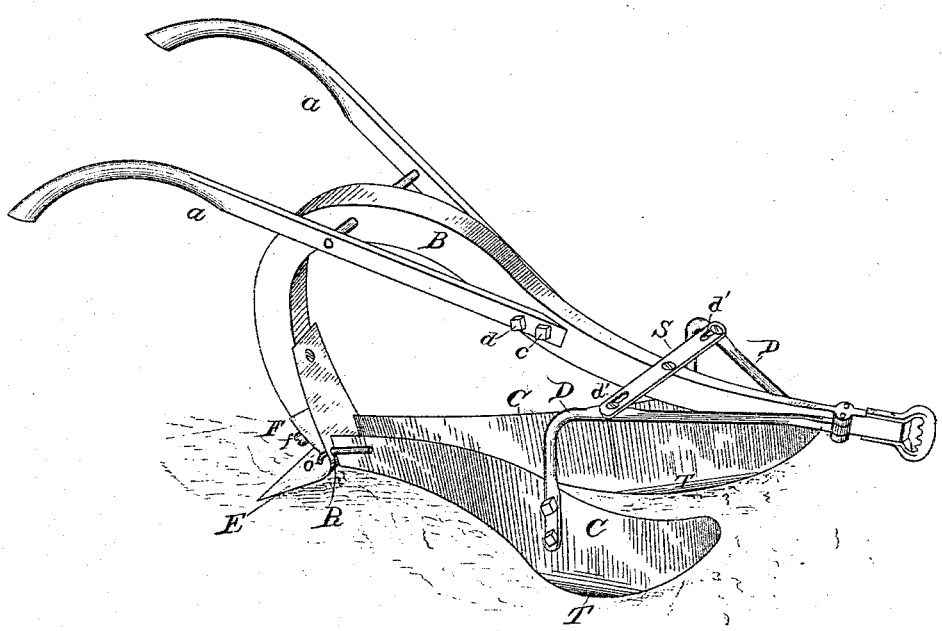

(No Model.) 2 Sheets—Sheet 1.
C. BAKER.
POTATO DIGGER AND COVERER.
No. 325,475. Patented Sept. 1, 1885.
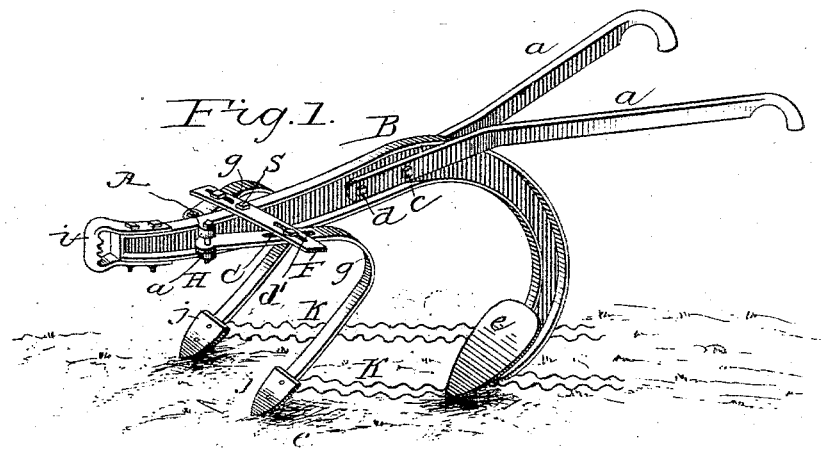
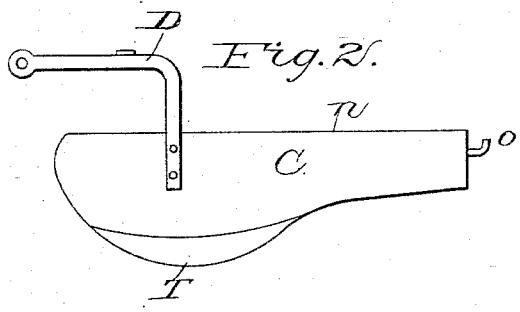
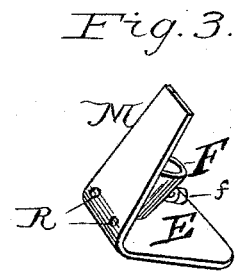
Witnesses:
Webster Hewitt
Henry C. Dixon
Inventor.
Curtis Baker (No Model.) 2 Sheets—Sheet 2.

C. BAKER.
POTATO DIGGER AND COVERER.

No. 325,475. Patented Sept. 1, 1885.

WITNESSES
Percy C. Bowen
Wm. N. Moore

INVENTOR
Curtis Baker
By his Attorneys
C. A. Snow & Co.

UNITED STATES PATENT OFFICE.

CURTIS BAKER, OF MILLER'S CORNERS, NEW YORK.

POTATO DIGGER AND COVERER.

SPECIFICATION forming part of Letters Patent No. 325,475, dated September 1, 1885.

Application filed March 6, 1885. (No model.)

*To all whom it may concern:*

Be it known that I, CURTIS BAKER, a citizen of the United States, residing at Miller's Corners, in the county of Ontario and State of New York, have invented certain new and useful Improvements in Potato Diggers and Coverers, of which the following is a description.

My invention relates to a combined potato digger and coverer, the object being to provide a device of this character which shall be simple in its construction, effective in its operation, and strong and durable, and one that may be readily and quickly converted to serve as a digger or coverer.

With these ends in view the invention consists in the improved construction and combinations of parts hereinafter fully described, and pointed out in the claims.

In the drawings, Figure 1 is a perspective view showing the device in use as a digger. Fig. 2 is a detail view of one of the coverer-wings. Fig. 3 is a perspective view of the shoe or coverer employed in connection with the coverer-wings, said shoe being shown detached; and Fig. 4 is a perspective view of the device in use as a coverer.

In the accompanying drawings, in which like letters of reference indicate corresponding parts in all the figures, B represents a plow-beam, to the forward end of which is secured a clevis, $i$. Handles $a$ extend rearwardly from the plow-beam B, said handles being secured at their forward ends to the beam B by bolts $d$ $c$. To the lower end of the plow-beam B is secured a plow, $e$, said plow having a socket on its rear side to receive the lower end of the beam B, and working in the socket is a set screw for holding the plow in place. This construction of socket and the set-screw are shown in detail in Fig. 3 as applied to the covering-shoe; hence it is thought that an illustration thereof is not necessary.

Upon the sides of the plow-beam B, near the forward end thereof, are provided outwardly-extending lugs, between which are pivoted, by means of bolts H, drag-bars $g$, to the lower ends of which are secured teeth $j$. The bars $g$ are provided with elongated slots $c$, in which fit bolts, which work in elongated slots $d'$, formed in a bar, S, connecting said drag-bars $g$. It will be seen that as the drag-bars $g$ are vertically pivoted at their forward ends and adjustably connected by the bar S, they may be adjusted to or from each other.

Pivoted to the rear sides of the drag-bars $g$, at their lower ends, are convoluted rods K, which may have a free vertical movement, but are held against lateral movement by their pivots. These bars are adapted, after the potatoes are dug, to throw the dirt aside to expose the potatoes to view.

C represents the coverer-wings, the lower ends of which are turned slightly inward, as at T, to form a cutting-edge, which is adapted to dig up lumps of soil where the same is hard or grassy. The coverers C are provided with angular arms D, which are pivoted at their forward ends between the lugs $a$ on the plow-beam, and are connected by the plate S.

E represents the covering-shoe, the lower end of which is turned rearwardly and rests upon the ground. Upon the rear side of said covering-shoe is provided a socket, F, which is adapted to receive the lower end of the plow-beam. Working in an opening in said socket is a screw, $f$, by means of which the coverer is held upon the beam B.

Extending from the rear ends of the coverer-wings C are hooks $o$, which are adapted to engage openings R in the covering-shoe, thus holding the rear ends of the wings in place and preventing them from spreading.

When the device is used as a digger, the plow $e$, the drag-bars $g$, having the teeth $j$, and the rods K are employed, as shown in Fig. 1. When the device is used as a coverer, the drag-bars $g$, carrying the teeth $j$, are detached and the coverers C substituted therefor. The plow $e$ is also detached and the covering shoe E fitted upon the beam B.

Having thus described my invention, I claim—

1. The beam B, the angular arms D, pivoted thereto, and the plate adjustably connecting said arms, in combination with the coverers secured to arms D, and having hooks $o$, and the coverer E, secured to the beam B, and having openings to receive the hooks $o$, as set forth.

2. The combination, with the plow-beam, of the wings C, having hooks $o$, and the coverer having openings to receive the same, as set forth.

CURTIS BAKER.

Witnesses:
WM. LAY,
ELWYN BAILEY.